United States Patent
Nishibori et al.

(10) Patent No.: US 10,421,334 B2
(45) Date of Patent: Sep. 24, 2019

(54) ELECTRIC COMPRESSOR

(71) Applicant: Panasonic Intellectual Property Management Co., Ltd., Osaka (JP)

(72) Inventors: Kei Nishibori, Shiga (JP); Makoto Iwasa, Shiga (JP); Nobuaki Ogawa, Shiga (JP); Takeshi Imanishi, Shiga (JP); Yoshifumi Abe, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 249 days.

(21) Appl. No.: 15/127,755

(22) PCT Filed: Nov. 17, 2015

(86) PCT No.: PCT/JP2015/005723
§ 371 (c)(1),
(2) Date: Sep. 20, 2016

(87) PCT Pub. No.: WO2016/098279
PCT Pub. Date: Jun. 23, 2016

(65) Prior Publication Data
US 2017/0259647 A1    Sep. 14, 2017

(30) Foreign Application Priority Data
Dec. 18, 2014 (JP) ................................. 2014-256580

(51) Int. Cl.
*B60H 1/00* (2006.01)
*F04B 39/00* (2006.01)
(Continued)

(52) U.S. Cl.
CPC ....... *B60H 1/00535* (2013.01); *B60H 1/3226* (2013.01); *B60H 1/3229* (2013.01);
(Continued)

(58) Field of Classification Search
CPC ........ F04B 39/00; F04B 39/12; F04B 39/127; F04C 29/00; F04C 2240/30;
(Continued)

(56) References Cited

U.S. PATENT DOCUMENTS

| 8,714,943 B2* | 5/2014 | Bahmata ............... F01C 21/007 403/365 |
| 2003/0002999 A1* | 1/2003 | Sakurabayashi ...... F04C 23/008 417/374 |

(Continued)

FOREIGN PATENT DOCUMENTS

| CN | 101463814 A | 6/2009 |
| CN | 102343857 A | 2/2012 |

(Continued)

OTHER PUBLICATIONS

Extended European Search Report, dated Nov. 17, 2017, for the related European Patent Application No. 15869493.5-1616 / 3236070, 8 pages.

(Continued)

*Primary Examiner* — Kenneth J Hansen
*Assistant Examiner* — Chirag Jariwala
(74) *Attorney, Agent, or Firm* — Seed IP Law Group LLP

(57) ABSTRACT

An electric compressor mounted to a vehicle includes a motor, a compression unit driven by the motor, an inverter unit for driving the motor, a housing for accommodating the motor, the compression unit, and the inverter unit, and a cover mounted to the housing for closing a space accommodating the inverter unit. The electric compressor is fixed to the vehicle by means of a first mounting leg provided to the housing, and a second mounting leg provided to the cover. The second mounting leg includes a stress concentration part at which stress concentrates as compared with another portion of the second mounting leg.

1 Claim, 3 Drawing Sheets

(51) Int. Cl.
  *F04C 29/00* (2006.01)
  *F04B 39/12* (2006.01)
  *B60H 1/32* (2006.01)

(52) U.S. Cl.
  CPC .............. *F04B 39/00* (2013.01); *F04B 39/12* (2013.01); *F04C 29/00* (2013.01)

(58) Field of Classification Search
  CPC ............ F04C 2240/40; F04C 2240/403; F04D 29/60; F04D 29/601; B60H 1/00521; B60H 1/3222; B60H 1/3226; B60H 1/3229; B60H 1/00535
  USPC .......................... 417/410.1, 423.14, 360, 363
  See application file for complete search history.

(56) References Cited

U.S. PATENT DOCUMENTS

| | | |
|---|---|---|
| 2009/0151389 A1 | 6/2009 | Iguchi et al. |
| 2010/0226800 A1 | 9/2010 | Ichise et al. |
| 2012/0251350 A1 | 10/2012 | Suitou et al. |
| 2014/0003973 A1* | 1/2014 | Arai .................... F04D 29/4206 417/363 |

FOREIGN PATENT DOCUMENTS

| | | |
|---|---|---|
| DE | 10 2011 009 702 A1 | 11/2011 |
| EP | 2 075 470 A2 | 7/2009 |
| EP | 2 412 574 A1 | 2/2012 |
| JP | 2009-085082 | 4/2009 |
| JP | 2009-150236 | 7/2009 |
| JP | 2012-202302 | 10/2012 |
| JP | 2012-202379 | 10/2012 |

OTHER PUBLICATIONS

International Search Report of PCT application No. PCT/JP2015/005723 dated Feb. 9, 2016.
English Translation of Chinese Search Report dated Jul. 10, 2018 for the related Chinese Patent Application No. 201580017572.3.

* cited by examiner

ELECTRIC COMPRESSOR

TECHNICAL FIELD

The present disclosure relates to an electric compressor mounted to a vehicle.

BACKGROUND ART

It is conventionally known that an electric compressor for air conditioning inside a vehicle such as a car is mounted to the vehicle. As described, for example, in Unexamined Japanese Patent Publication No. 2009-150236, the electric compressor includes a motor, a compression unit driven by the motor, an inverter unit (inverter circuit board) for driving the motor, and a housing for accommodating the motor, the compression unit, and the inverter unit.

The housing of the electric compressor is provided with a plurality of mounting legs for mounting the electric compressor to the vehicle. An electric compressor described in PTL 1, for example has three mounting legs. The two of the three mounting legs are provided integrally with an exterior of the housing to be opposite to an internal space that accommodates the motor and the compression unit. The remaining one of the three mounting legs is provided integrally with a cover that closes an internal space accommodating the inverter circuit board. The mounting legs each have a through hole through which a shaft of a bolt passes. With the mounting legs fixed to the vehicle by the bolts, the electric compressor is mounted to a designated position such as an engine of the vehicle.

SUMMARY

The present disclosure relates to an electric compressor mounted to a vehicle. The electric compressor includes: a motor; a compression unit driven by the motor; an inverter unit for driving the motor; a housing for accommodating the motor, compression unit, and the inverter unit; a cover mounted to the housing for closing a space accommodating the inverter unit; a first mounting leg which is to be fixed to the vehicle and provided to the housing; and a second mounting leg which is to be fixed to the vehicle and provided to the cover. The second mounting leg includes a stress concentration part at which stress concentrates as compared with another portion of the second mounting leg.

DESCRIPTION OF EMBODIMENTS

Figure 1:
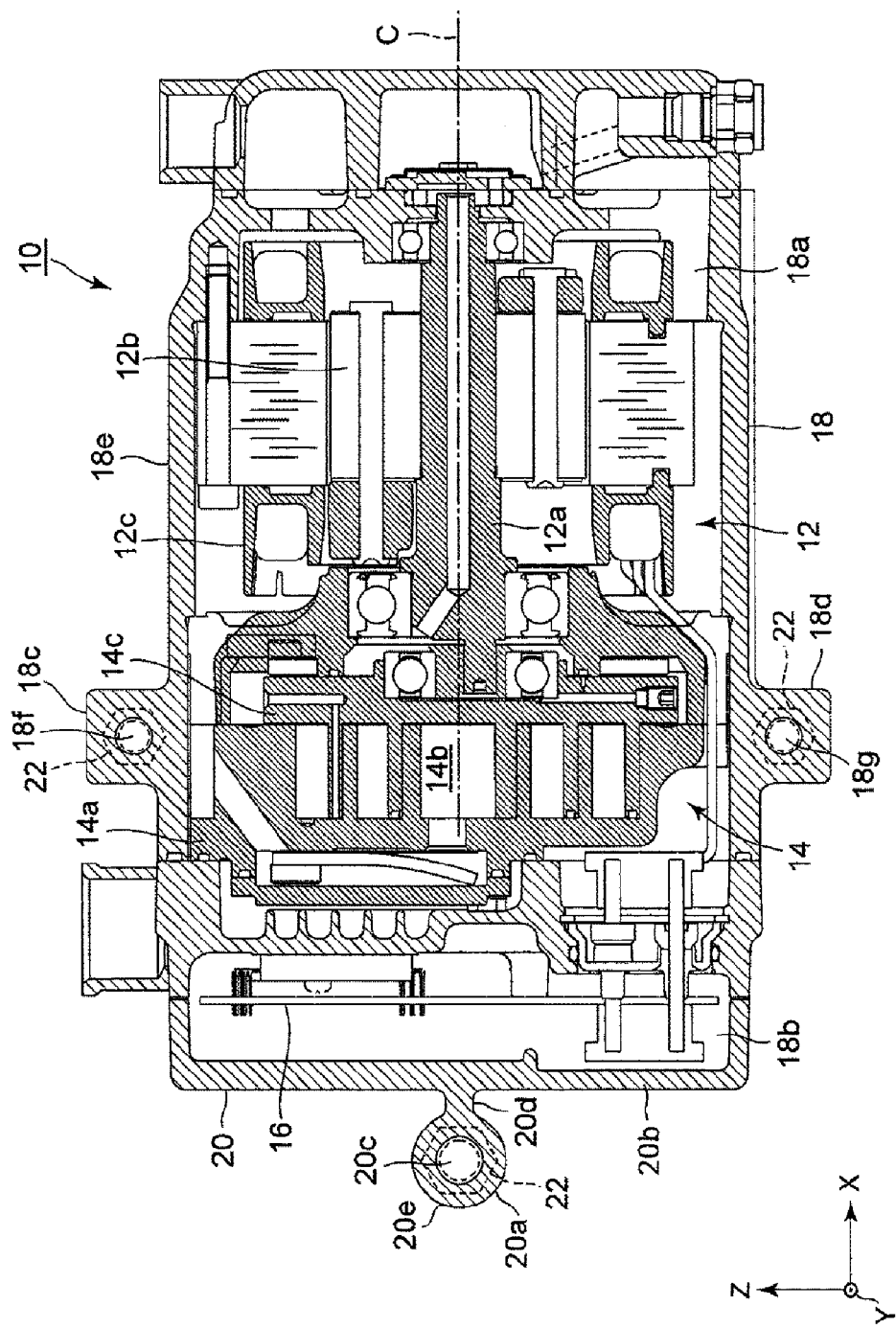
FIG. 1 is a sectional view of an electric compressor in accordance with a first exemplary embodiment.

Prior to a description of exemplary embodiments of the present disclosure, a description for a problem of a conventional structure is provided.

A great impact applied to a vehicle in a collision or the like can cause damage in a vicinity of a root of a mounting leg of an electric compressor. As a result, a housing may possibly be damaged and have a hole near the mounting leg, whereby a motor and others that are accommodated by the housing are exposed externally. In an electric compressor, for example, described in PTL 1, a cover provided with a mounting leg may possibly be damaged, whereby an inverter circuit board to which a high voltage is applied is exposed externally.

To prevent the inverter circuit board in the electric compressor from being exposed externally as a result of the damage in the vicinity of the root of the mounting leg, the housing may have the mounting leg in a position distant from the inverter circuit board. For example, the mounting leg may be provided in some place other than the cover that closes an internal space accommodating the inverter circuit board. In this case, however, a layout of mounting legs (that is, a position of each of the mounting legs on the electric compressor) is limited. Consequently, the electric compressor has a limited mounting position and a limited mounting attitude with respect to the vehicle. A description is provided hereinafter of structures solving such a problem.

An electric compressor in accordance with one aspect of the present disclosure is mounted to a vehicle. The electric compressor includes: a motor; a compression unit driven by the motor; an inverter unit for driving the motor; a housing for accommodating the motor, compression unit, and the inverter unit; a cover mounted to the housing for closing a space accommodating the inverter unit; a first mounting leg which is to be fixed to the vehicle and provided to the housing; and a second mounting leg which is to be fixed to the vehicle and provided to the cover. The second mounting leg includes a stress concentration part at which stress concentrates as compared with another portion of the second mounting leg.

According to this aspect of the present disclosure, when the electric compressor is damaged as a result of a great impact applied to the vehicle, exposure of the inverter unit in the electric compressor is prevented without limiting a layout of the mounting legs used for mounting the electric compressor to the vehicle. In other words, when the great impact is applied to the vehicle, damage to the stress concentration part of the mounting leg is prioritized, thereby damage to the cover can be prevented even when the mounting leg is provided to the cover.

The second mounting leg may be integral with the cover and include a vehicle fixing part to be fixed to the vehicle, and a constricted part extending from the vehicle fixing part and connecting with the cover. The constricted part may function as the stress concentration part. When the great impact is applied to the vehicle, damage to the constricted part of the second mounting leg is prioritized, thereby the damage to the cover can be prevented.

The second mounting leg may be separate from the cover and include a vehicle fixing part to be fixed to the vehicle, and a cover fixing part extending from the vehicle fixing part to be fixed to the cover. A connection part between the vehicle fixing part and the cover fixing part, which has a stepped shape, may function as the stress concentration part. When the great impact is applied to the vehicle, damage to the connection part between the vehicle fixing part and the cover fixing part of the second mounting leg is prioritized, thereby the damage to the cover can be prevented.

The cover fixing part of the second mounting leg may extend from the vehicle fixing part in a direction intersecting a fore-and-aft direction of the vehicle. Thus, shearing stress is generated in the connection part between the vehicle fixing part and the cover fixing part when, for example, the running vehicle collides with a construction, whereby the damage to the connection part between the vehicle fixing part and the cover fixing part is easily prioritized.

Preferably, when the cover includes a boss projecting from an outer surface of the cover, and the cover fixing part of the second mounting leg is mounted to a leading end of the boss, a sectional area of the boss at a part connecting with the outer surface of the cover is larger than a sectional area of the cover fixing part at the connection part connecting with the vehicle fixing part of the second mounting leg. Thus, while damage to the connection part between the outer surface of the cover and the boss is prevented, the damage to the connection part between the vehicle fixing part and the cover fixing part of the second mounting leg is prioritized.

One of the exemplary embodiments of the present disclosure is described hereinafter with reference to the accompanying drawings.

First Exemplary Embodiment

FIG. 1 is a sectional view of an electric compressor in accordance with the first exemplary embodiment. It is noted that in the present specification, an X-axis is a width direction of a vehicle (for example, a car) mounted with the electric compressor, a Y-axis is a fore-and-aft direction of the vehicle, and a Z-axis is a height direction of the vehicle.

As shown in FIG. 1, electric compressor 10 in accordance with the present exemplary embodiment includes motor 12, compression unit 14 driven by motor 12 to execute compression work, and inverter unit 16 for driving motor 12. Motor 12, compression unit 14, and inverter unit 16 line up along an extended direction of rotation centerline C of motor 12 (along the width direction of the vehicle: along the X-axis).

Motor 12 includes rotating shaft 12a, rotor 12b provided to rotating shaft 12a, and stator 12c provided outside rotor 12b.

Compression unit 14 includes fixed scroll 14a, and movable scroll 14c defining compression space 14b in association with fixed scroll 14a. Movable scroll 14c is mounted to rotating shaft 12a of motor 12, thereby being rotatively driven by motor 12.

Inverter unit 16 is a board formed with an inverter circuit and supplies alternating voltage to stator 12c of motor 12.

Electric compressor 10 also includes housing 18 for accommodating motor 12, compression unit 14, and inverter unit 16. Housing 18 includes first internal space 18a accommodating motor 12 and compression unit 14, and second internal space 18b accommodating inverter unit 16. In addition, housing 18 is mounted with cover 20 which closes second internal space 18b accommodating inverter unit 16.

A plurality of mounting legs 18c, 18d, 20a are provided to electric compressor 10 for mounting electric compressor 10 to the vehicle. In the present exemplary embodiment, electric compressor 10 has three mounting legs.

Two mounting legs 18c, 18d are provided on outer peripheral surface 18e of housing 18. In the present exemplary embodiment, these two mounting legs 18c, 18d are provided integrally with outer peripheral surface 18e of housing 18 in the height direction of the vehicle (along the Z-axis) to be opposite to compression unit 14 accommodated by housing 18.

On the other hand, remaining mounting leg 20a is provided integrally with outer surface 20b of cover 20 which closes second internal space 18b accommodating inverter unit 16.

Through holes 18f, 18g, 20c, each of which allows a shaft of bolt 22 to pass, are formed in mounting legs 18c, 18d, 20a, respectively. In the present exemplary embodiment, through holes 18f, 18g, 20c extend in the fore-and-aft direction of the vehicle (along the Y-axis). In other words, electric compressor 10 is mounted to a designated position such as an engine (not shown) of the vehicle in the fore-and-aft direction of the vehicle by bolts 22 passing through respective through holes 18f, 18g, 20c of mounting legs 18c, 18d, 20a.

Mounting leg 20a provided integrally with cover 20 includes constricted part 20d functioning as a stress concentration part.

"The stress concentration part" mentioned here is a part at which impact-derived stress (such as shearing stress or compressive stress) concentrates as compared with other portions when a great impact is applied to the vehicle mounted with electric compressor 10. Accordingly, damage to this stress concentration part is prioritized for preventing damage to the other portions of electric compressor 10.

In cases where, for example, the running vehicle collides with another vehicle or a construction, or in cases where another vehicle collides with the vehicle making a stop, a great impact is applied to the vehicle. Associated with this great impact, a great inertial force acts on electric compressor 10. If mounting leg 20a does not have the stress concentration part such as constricted part 20d, there is a possibility of damage near a connection part between mounting leg 20a and cover 20. Consequently, cover 20 may possibly be damaged and have a hole, whereby inverter unit 16, to which a high voltage is applied, may be exposed externally.

In order to prevent the damage of cover 20, mounting leg 20a thus includes constricted part 20d, the damage of which is prioritized by concentration of the impact-derived stress.

In the present exemplary embodiment, through hole 20c, which extends in the fore-and-aft direction of the vehicle (along the Y-axis) to allow the shaft of bolt 22 to pass through, is formed in mounting leg 20a. Mounting leg 20a includes vehicle fixing part 20e which is fixed to the vehicle by bolt 22.

Constricted part 20d extends from vehicle fixing part 20e in a direction (along the X-axis in the present exemplary embodiment) intersecting the fore-and-aft direction of the vehicle and connects with cover 20.

When, for example, the running vehicle collides with a construction, impact force is applied to the vehicle in the fore-and-aft direction of the vehicle (along the Y-axis), and inertial force acts on electric compressor 10 in the fore-and-aft direction of the vehicle accordingly. The inertial force causes shearing stress in constricted part 20d extending in the direction (along the X-axis) intersecting the fore-and-aft direction of the vehicle. The shearing stress causes fracture of constricted part 20d with vehicle fixing part 20e being fixed to the vehicle by bolt 22 while at least a portion of constricted part 20d remains integrally with cover 20. With the fracture of constricted part 20d thus prioritized, such the damage to cover 20 as to expose inverter unit 16 externally is prevented.

The reason why the stress concentrates at constricted part 20d of mounting leg 20a is as follows. Constricted part 20d has a sharply reduced sectional area in a path of force (stress) transmitted from housing 18 through mounting leg 20a to the vehicle when the inertial force acts on electric compressor 10.

As a matter of course, constricted part 20d has such strength as to withstand damage caused by an inertial force which acts on electric compressor 10 as a result of an impact caused during normal driving, such as sudden braking.

By prioritizing the damage to constricted part 20d of mounting leg 20a when the great impact is applied to the vehicle, the damage to remaining mounting legs 18c, 18d is prevented as a secondary effect. Consequently, motor 12 and compression unit 14 accommodated by housing 18 are prevented from being exposed externally.

According to the present exemplary embodiment, when electric compressor 10 is damaged as a result of the great impact applied to the vehicle, the exposure of inverter unit 16 in electric compressor 10 is prevented without limiting a layout of mounting legs 18c, 18d, 20a used for mounting electric compressor 10 to the vehicle.

Specifically, the damage to mounting leg 20a provided integrally with cover 20 is prioritized as compared with the damage to cover 20 when the great impact is applied to the vehicle in the collision or the like. For this reason, mounting leg 20a can be provided integrally with cover 20. In other words, mounting leg 20a need not be provided integrally with housing 18 at some place other than cover 20 to prevent the damage to cover 20. Consequently, the layout of mounting legs 18c, 18d, 20a has a greater degree of freedom, whereby a mounting position and a mounting attitude of electric compressor 10 with respect to the vehicle each have a greater degree of freedom as compared with cases where mounting leg 20a cannot be provided to cover 20.

Second Exemplary Embodiment

The second exemplary embodiment differs substantially from the above-described first exemplary embodiment in that a mounting leg provided to a cover is separate from the cover. Except for this difference, the second exemplary embodiment is substantially the same as the first exemplary embodiment. Thus, a description of the present exemplary embodiment centers on the substantial difference.

Figure 2:
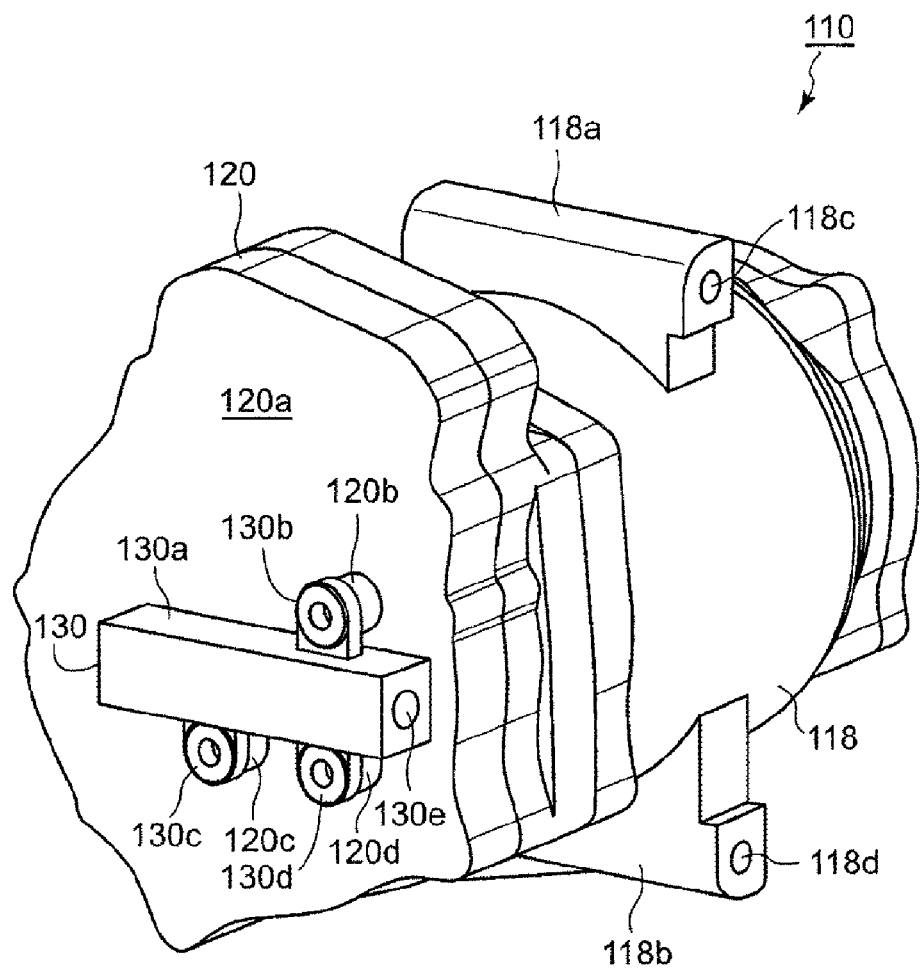
FIG. 2 is an external perspective view of an electric compressor in accordance with a second exemplary embodiment.

FIG. 2 is an external perspective view of electric compressor 110 in accordance with the present exemplary embodiment. As shown in FIG. 2, cover 120 is provided with, on its outer surface 120a, mounting leg 130 which is separate from cover 120, and housing 118 is integrally provided with mounting legs 118a, 118b.

Figure 3:
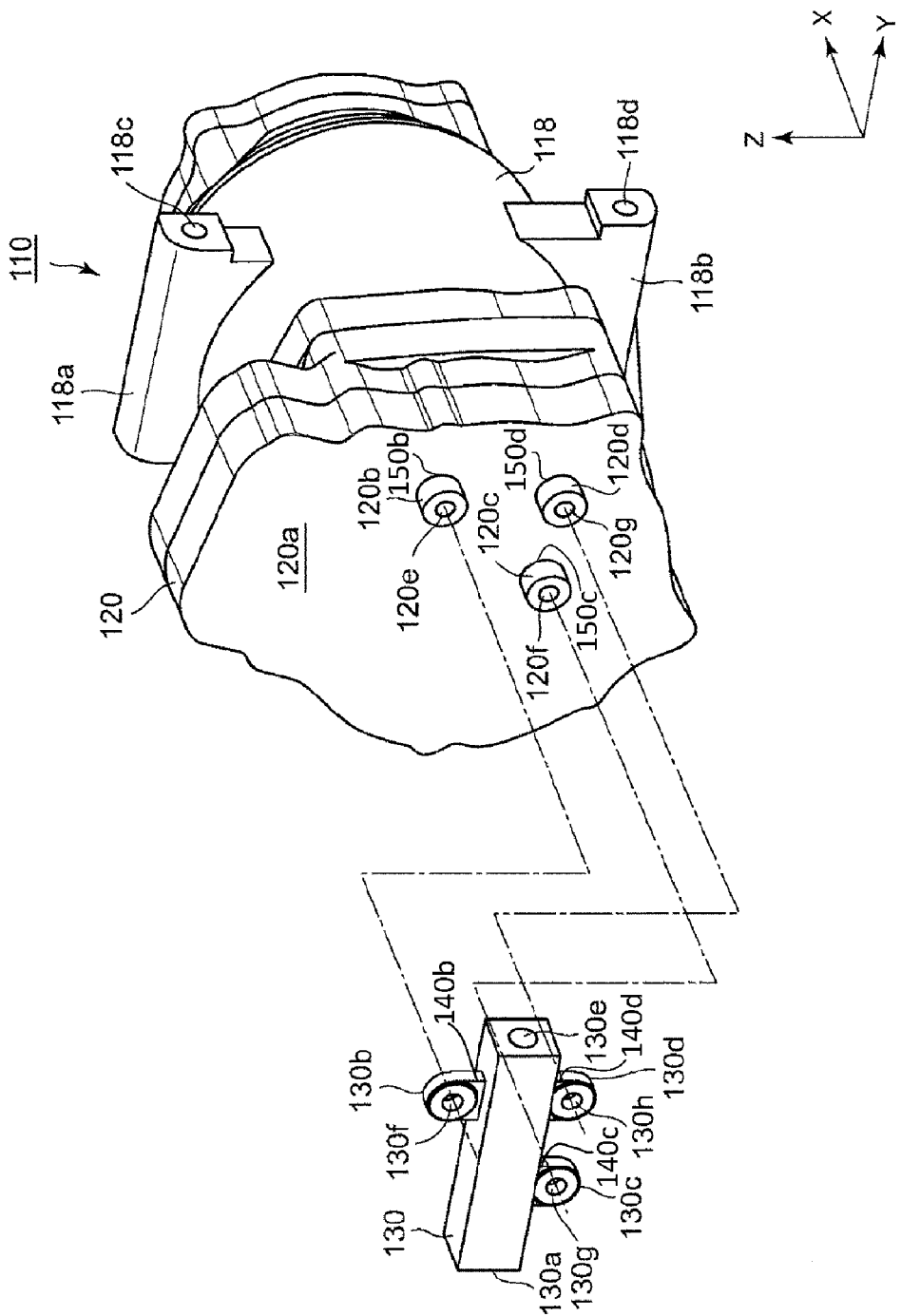
FIG. 3 is a perspective view of the electric compressor of FIG. 2 in a state that a mounting leg is detached from a cover.

FIG. 3 illustrates electric compressor 110 in a state that mounting leg 130 is detached from cover 120.

As shown in FIGS. 2 and 3, mounting leg 130 includes vehicle fixing part 130a which is to be fixed to a vehicle, and cover fixing parts 130b to 130d, each of which is shaped like a cantilever beam and extends from vehicle fixing part 130a to be fixed to cover 120.

In the present exemplary embodiment, through hole 130e, through which a shaft of a bolt (not shown) is passed for fixing electric compressor 110 to the vehicle, is formed in vehicle fixing part 130a of mounting leg 130. Through hole 130e of vehicle fixing part 130a extends in a fore-and-aft direction of the vehicle (along a Y-axis).

Similarly, mounting legs 118a, 118b provided integrally with housing 118 extend in the fore-and-aft direction of the vehicle (along the Y-axis). Through holes 118c, 118d, through which shafts of bolts (not shown) pass for fixing electric compressor 110 to the vehicle are formed in mounting legs 118a, 118b, respectively.

By means of such mounting legs 118a, 118b, 130, electric compressor 110 is mounted to a designated position of the vehicle in the fore-and-aft direction of the vehicle (along the Y-axis).

In the present exemplary embodiment, mounting leg 130 includes three cover fixing parts 130b to 130d. Cover fixing part 130b extends upward from vehicle fixing part 130a, and remaining cover fixing parts 130c, 130d line up along the fore-and-aft direction of the vehicle (along the Y-axis) and extend downward from vehicle fixing part 130a.

As shown in FIG. 3, three cover fixing parts 130b to 130d of mounting leg 130 are fixed to respective leading ends of corresponding bosses 120b to 120d projecting from outer surface 120a of cover 120.

Specifically, through holes 130f to 130h extending in a width direction of the vehicle (along an X-axis) are formed in three cover fixing parts 130b to 130d of mounting leg 130, respectively. On the other hand, bosses 120b to 120d of cover 120 are formed with, in their top faces, respective female screw holes 120e to 120g extending in the width direction of the vehicle. Mounting leg 130 is mounted to cover 120 by engagement of bolts (not shown) passing through respective through holes 130f to 130h of three cover fixing parts 130b to 130d with respective female screw holes 120e to 120g of bosses 120b to 120d.

In the present exemplary embodiment, in mounting leg 130, stepped connection parts 140b to 140d between vehicle fixing part 130a and respective cover fixing parts 130b to 130d function as a stress concentration part.

It is noted that to prevent damage of cover 120 when a great impact is applied to the vehicle in a collision or the like, at least one of connection parts 140b to 140d between vehicle fixing part 130a and respective cover fixing parts 130b to 130d needs to be damaged. In other words, damage to connection parts 150b to 150d between outer surface 120a of cover 120 and respective bosses 120b to 120d needs to be prevented when the great impact is applied to the vehicle.

For this reason, sectional areas of bosses 120b to 120d at respective parts 150b to 150d connecting with outer surface 120a of cover 120 are larger than corresponding sectional areas of cover fixing parts 130b to 130d at respective parts 140b to 140d connecting with vehicle fixing part 130a of mounting leg 130.

More specifically, bosses 120b to 120d of cover 120 are integrated with respective cover fixing parts 130b to 130d of mounting leg 130 by the bolts (not shown), so that stress may possibly concentrate at the connection parts between outer surface 120a of cover 120 and respective bosses 120b to 120d when the great impact is applied to the vehicle.

In order to prevent the stress concentration at connection parts 150b to 150d between outer surface 120a of cover 120 and respective bosses 120b to 120d, the sectional areas of bosses 120b to 120d at respective connection parts 150b to 150d connecting with outer surface 120a of cover 120 are larger than the corresponding sectional areas of cover fixing parts 130b to 130d at respective parts 140b to 140d connecting with vehicle fixing part 130a of mounting leg 130. Accordingly, when the great impact is applied to the vehicle, stress concentration at connection parts 140b to 140d between vehicle fixing part 130a of mounting leg 130 and respective cover fixing parts 130b to 130d is prioritized. Consequently, while the damage to connection parts 150b to 150d between outer surface 120a of cover 120 and respective bosses 120b to 120d is prevented, the damage to connection parts 140b to 140d between vehicle fixing part 130a and respective cover fixing parts 130b to 130d of mounting leg 130 is prioritized.

When, for example, the running vehicle collides with a construction, impact force is applied to the vehicle in the fore-and-aft direction of the vehicle (along the Y-axis), and inertial force acts on housing 118 of electric compressor 110 in the fore-and-aft direction of the vehicle accordingly. The inertial force causes shearing stress in connection parts 140b to 140d which extend in the direction (along the X-axis)

intersecting the fore-and-aft direction of the vehicle and are defined between respective cover fixing parts 130*b* to 130*d* and vehicle fixing part 130*a*. The shearing stress causes fracture of mounting leg 130 with vehicle fixing part 130*a* being fixed to the vehicle by the bolt while at least a portion of cover fixing parts 130*b* to 130*d* remains with cover 120. With the fracture of mounting leg 130 thus prioritized, such damage to cover 120 as to expose an inverter unit externally is prevented.

According to the present exemplary embodiment, when electric compressor 110 is damaged as a result of the great impact applied to the vehicle, the exposure of the inverter unit in electric compressor 110 is prevented without limiting a layout of mounting legs 118*a*, 118*b*, 130 used for mounting electric compressor 110 to the vehicle.

The first and second exemplary embodiments have been described above for explanation of the present disclosure. However, the present disclosure is not limited to these first and second exemplary embodiments.

For example, in the above-described first and second exemplary embodiments, constricted part 20*d* of mounting leg 20*a* and connection parts 140*b* to 140*d* between vehicle fixing part 130*a* of mounting leg 130 and respective cover fixing parts 130*b* to 130*d* are damaged by the shearing stress when the great impact is applied to the vehicle. In other words, the mounting leg has the stress concentration part in constricted or stepped form that is damaged by the shearing stress. However, exemplary embodiments of the present disclosure are not limited to this. The stress concentration part may be damaged, for example, by buckling as a result of concentration of compressive stress when a great impact is applied to the vehicle (thereby causing a great inertial force to act on the housing of the electric compressor).

In the above-described first and second exemplary embodiments, the stress concentration part is identified as constricted part 20*d* or stepped connection parts 140*b*, 140*c*, 140*d* between vehicle fixing part 130*a* and respective cover fixing parts 130*b*, 130*c*, 130*d*. However, the present disclosure is not limited to such stress concentration parts.

In a broad sense, the stress concentration part of the mounting leg is a part at which stress concentrates as compared with other portions of the electric compressor when a great impact is applied to the vehicle, thereby causing a great inertial force to act on the electric compressor. Specifically, the stress concentration part has a greatly changed sectional area intersecting a path of force (stress such as compressive force, tensile force, torsional force, or shearing force) which is transmitted from the electric compressor through the mounting leg to the vehicle when the great inertial force acts on the electric compressor upon application of the great impact to the vehicle. Forms of the stress concentration part include, for example, the constricted form, the stepped form, and a notched form.

The present disclosure is applicable to any electric compressor which is mounted to a vehicle and has an inverter unit.

What is claimed is:

1. An electric compressor for mounting to a vehicle, the electric compressor comprising:
   a motor;
   a compression unit driven by the motor;
   an inverter unit for driving the motor;
   a housing for accommodating the motor, the compression unit, and the inverter unit, the housing including a first mounting leg for fixing to the vehicle;
   a cover mounted to the housing for closing a space accommodating the inverter unit; and
   a second mounting leg directly fixable to the vehicle, the second mounting leg directly fixable to the cover and including a stress concentration part at which stress concentrates as compared with another portion of the second mounting leg;
   wherein
      the second mounting leg is separate from the cover and includes a vehicle fixing part directly fixable to the vehicle, and a cover fixing part extending from the vehicle fixing part, the cover fixing part directly fixable to the cover;
      a stepped connection part between the vehicle fixing part and the cover fixing part, the stepped connection part functioning as the stress concentration part;
      the cover fixing part of the second mounting leg extends from the vehicle fixing part in a direction intersecting a fore-and-aft direction of the vehicle;
      the cover includes a boss projecting from an outer surface of the cover;
      the cover fixing part of the second mounting leg is mounted to a leading end of the boss; and
      a sectional area of the boss at a part connecting with the outer surface of the cover is larger than a sectional area of the cover fixing part at the stepped connection part connecting with the vehicle fixing part of the second mounting leg.

* * * * *